(12) United States Patent
Warin et al.

(10) Patent No.: US 7,134,627 B2
(45) Date of Patent: Nov. 14, 2006

(54) DEVICE FOR LASHING DOWN ROTORCRAFT BLADES

(75) Inventors: Violaine Warin, Grans (FR); Gilles Herpin, Saint-Chamas (FR)

(73) Assignee: Eurocopter, Marignane Cedex (FR)

( * ) Notice: Subject to any disclaimer, the term of this patent is extended or adjusted under 35 U.S.C. 154(b) by 43 days.

(21) Appl. No.: 10/970,000

(22) Filed: Oct. 22, 2004

(65) Prior Publication Data
US 2005/0178901 A1 Aug. 18, 2005

(30) Foreign Application Priority Data
Oct. 30, 2003 (FR) .................................. 03 12694

(51) Int. Cl.
*B64F 1/12* (2006.01)
(52) U.S. Cl. ............................. 244/17.11; 244/114 R; 244/115; 150/154
(58) Field of Classification Search ............. 244/17.11, 244/17.17, 1 R, 115, 116, 114 R; 135/88.01, 135/88.03; 150/154, 157, 166
See application file for complete search history.

(56) References Cited

U.S. PATENT DOCUMENTS

| | | | |
|---|---|---|---|
| 1,905,587 A | 4/1933 | Hafer, Sr. et al. | |
| 1,913,032 A | 6/1933 | Krause | |
| 3,288,401 A | 11/1966 | Charles | |
| 4,022,546 A | 5/1977 | Drees et al. | |
| 4,613,096 A | 9/1986 | Pugh | |
| 5,179,968 A * | 1/1993 | Deichmann | 135/88.01 |
| 6,749,151 B1 * | 6/2004 | Ross | 244/1 R |
| 6,854,475 B1 * | 2/2005 | Slabbert | 135/88.01 |

FOREIGN PATENT DOCUMENTS

| | | |
|---|---|---|
| GB | 2370548 | 7/2002 |
| NL | 288231 | 3/1965 |
| WO | WO 92/19497 | 11/1992 |

* cited by examiner

*Primary Examiner*—Galen Barefoot
(74) *Attorney, Agent, or Firm*—Young & Thompson

(57) ABSTRACT

The present invention relates to a device for lashing down a rotorcraft wing, said wing being provided with at least first and second adjacent blades P and P', the ends of said blades being provides with respective endpieces. In addition, the device comprises a main cord CP having a first end CPE1 fastened to first fastener means 5' arranged on a second end CPE2 secured to a second blade P' and having a second end CPE2 secured to a second fastener means M1 arranged on a first endpiece of the first blade P. The lashing-down endpiece includes first fastener means 5 for fastening to a first main cord CP and second fastener means M1 for fastening to a second main cord CP.

17 Claims, 2 Drawing Sheets

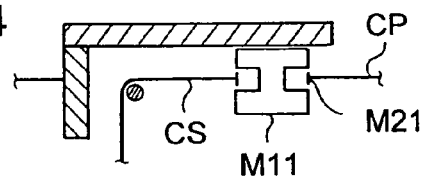
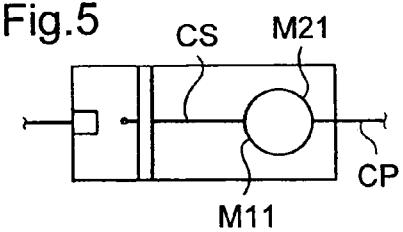
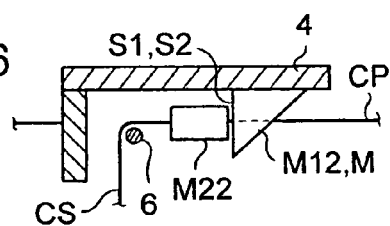
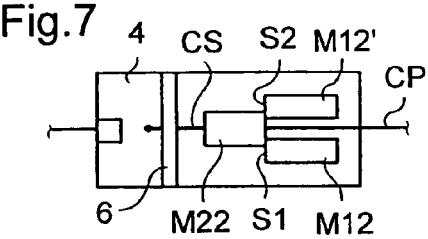
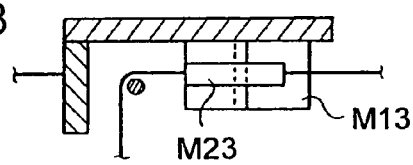
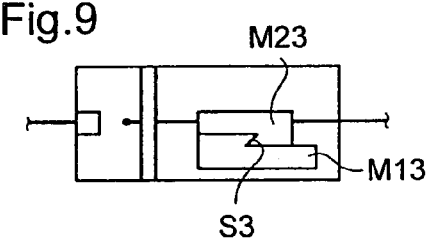
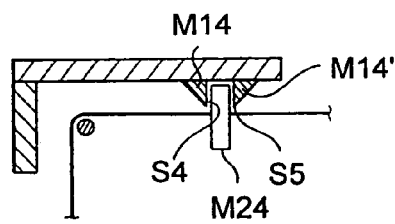
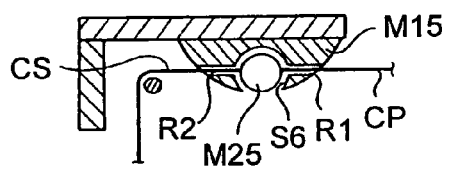
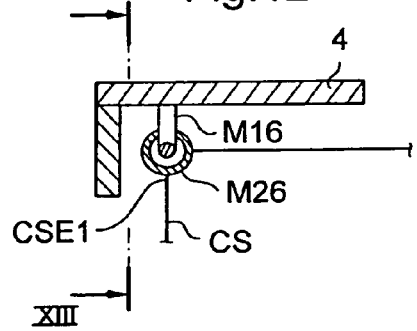
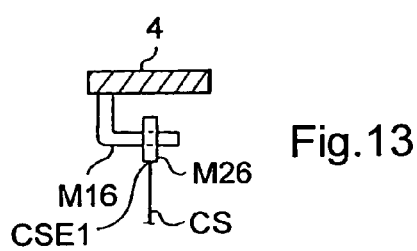

DEVICE FOR LASHING DOWN ROTORCRAFT BLADES

The present invention relates to a device for lashing down the blades of a rotorcraft when in a "camping" position, i.e. when the rotorcraft is parked outdoors, whether on land or at sea.

BACKGROUND OF THE INVENTION

On a parking area, the rotorcraft is subjected to weather conditions and more particularly to wind that can sometimes be violent.

The rotors of most modern rotorcrafts are equipped with blades that are flexible. As a result, while camping, such blades can start flapping vertically under the action of the wind.

This phenomenon lies behind many problems:
personnel working on the ground can be injured by a blade moving suddenly downwards;
when the blades are fitted with flapping hinges and bottom abutments, then during wind-driven vertical movements, the hinges and the abutments are subjected to high levels of force that can damage them in the long run;
depending on the locations of the blades, they can be blown by the wind so as to come into contact with structural elements of the rotorcraft, thereby leading to severe damage; and
finally, a rising blade can cause the rotorcraft to be turned over.

A first known solution consists in a sock which covers the tip cap of a blade. A cord secured firstly to the sock and secondly to the structure of the rotorcraft, limits movements of the blade. Nevertheless, it is not unusual for socks to become deformed or to separate from the tip cap under wind forces.

A second known solution consists in a support permanently secured to the blade tip cap and in a removable endpiece which is connected to said support when lashing down. The blade is held by tensioning the cord between said endpiece and an anchor point provided on the structure of the rotorcraft. Those systems have the advantage of never coming undone.

Nevertheless, in both of the above-mentioned solutions, keeping the blades in a low position induces high levels of force on the anchor points of the rotorcraft. That means that the anchor points must be overdimensioned in order to be able to withstand high levels of force, and that is extremely penalizing, particularly in terms of cost and weight.

Furthermore, it is sometimes difficult to position the rotor blades so that they are in register with the anchor points, for example a blade might overlie the tail boom or the nose of the rotorcraft. Personnel in charge of lashing down then look for anchor points other than those initially provided, and that can lead to damage to the structure.

OBJECTS AND SUMMARY OF THE INVENTION

An object of the present invention is to provide a device for lashing down rotorcraft blades that enables the above-described limitations to be obviated.

According to the invention, an endpiece for lashing down a rotorcraft blade, designed to be secured to the end of said blade and provided with first fastener means for fastening to a first main cord, further comprises second fastener means for fastening to a second main cord.

Advantageously, this lashing-down endpiece possesses one or more of the following characteristics:
for a main cord extended by a secondary cord by link means, the link means co-operate with the second fastener means;
for the second end of the secondary cord being designed to be fastened to anchor means of the rotorcraft, deflector means support said secondary cord between the second fastener means and said anchor means;
the second fastener means is a peg;
the second fastener means has at least one surface on which the link means comes to bear; and
the second fastener means also constitutes deflector means.

The invention also provides a device for lashing down the wing of a rotorcraft provided with at least first and second adjacent blades, the ends of said blades being provided with respective first and second endpieces, said device comprising a main cord whose first end is fastened to a first fastener means arranged on the second endpiece of the second blade and whose second end is secured onto a second fastener means arranged on the first endpiece of the first blade.

It is also advantageous for said device to possess one or more of the following characteristics:
a secondary cord having its first end connected to the second end of the main cord by link means, said link means being designed to co-operate with said second fastener means;
anchor means on the rotorcraft designed for securing to the second end of the secondary cord; and
deflector means supporting the secondary cord between the second fastener means and the anchor means.

Furthermore, the link means is either a ring engaged in the second fastener means, or an abutment bearing against a surface of the second fastener means.

The second fastener means is preferably also a deflector means.

BRIEF DESCRIPTION OF THE DRAWINGS

The invention and its advantages will appear in greater detail on reading the following description of embodiments given by way of illustration with reference to the accompanying figures, in which:

FIGS. 4 and 5 are a profile view and a view from beneath of a first embodiment;

FIGS. 6 and 7 are a profile view and a view from beneath of a second embodiment;

FIGS. 8 and 9 are a profile view and a view from beneath of a third embodiment;

FIG. 10 is a profile view of a fourth embodiment;

FIG. 11 is a profile view of a fifth embodiment;

FIG. 12 is a profile view of a variant of the invention; and

FIG. 13 is a section view on line XIII of FIG. 12.

MORE DETAILED DESCRIPTION

Elements that are present in more than one Figure are given the same reference throughout.

Figure 1:
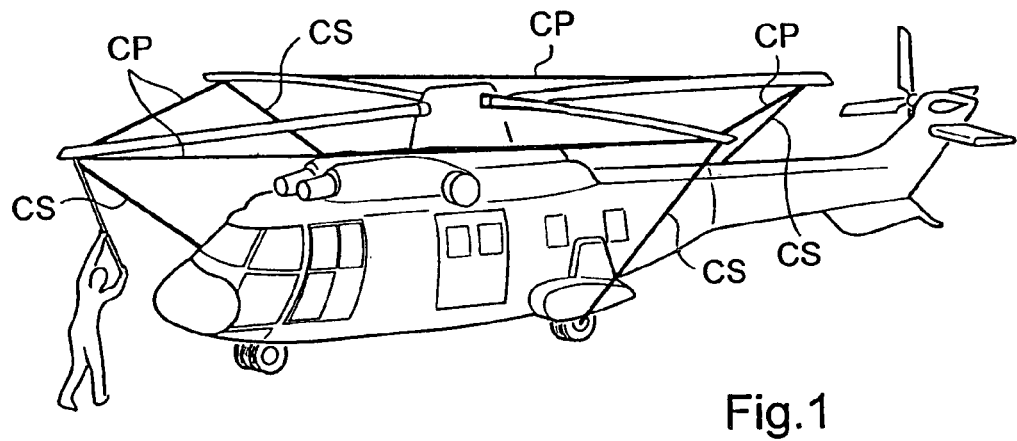
FIG. 1 is a diagrammatic view showing the architecture of a lashing-down device of the invention for a rotorcraft.

FIG. 1 shows the principle of lashing down in accordance with the invention. The blades of the rotorcraft wing are attached to one another. A regular polygon is implemented by interconnecting the blade tip caps by main cords CP. Since the main cords CP are tensioned, this leads indirectly to the blades flexing downwards.

Figure 2:
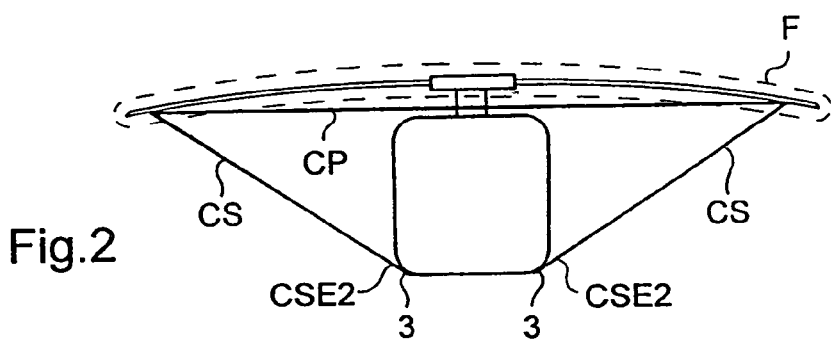
FIG. 2 shows two blades interconnected by a main cord.

FIG. 2 shows the "umbrella" shape F that is obtained when the tip caps of two adjacent blades are interconnected by a main cord CP. Under these conditions, the blades can no longer straighten out and therefore they can no longer flap under the effect of the wind.

In order to stabilize the rotor, it suffices to secure the polygon as formed in this way to the rotorcraft via only two or three anchor means 3 of the rotorcraft using second ends CSE2 of secondary cords CS. This makes it possible consequently to lash the rotor down properly under all conditions, including under circumstances in which a blade overlies the tail boom or the nose of the rotorcraft. In addition, the anchor means 3 of the rotorcraft do not need to be overdimensioned insofar as the traction force applied to a blade is not applied to the secondary cords CS, but only to the main cords CP.

Figure 3:
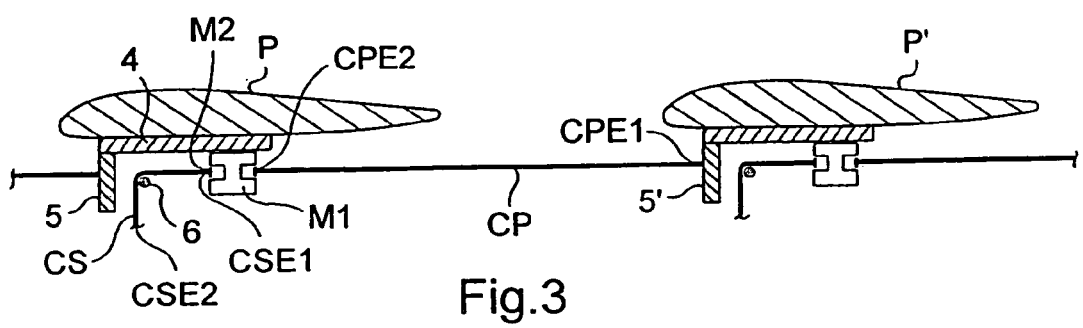
FIG. 3 is a diagrammatic view of a lashing-down device of the invention mounted on the tip caps of two blades.

With reference to FIG. 3, a lashing-down device of the invention is mounted on the tip caps of adjacent first and second blades P and P'. The device comprises a first endpiece on the blade P comprising an intermediate plate 4 having first fastener means 5, first deflector means 6, and second fastener means M1 enabling the main cord CP coming from the second blade P' to be attached quickly. This removable intermediate plate 4 is attached to the blade by a system of known type (keys, inserts, or other).

The second blade P' is provided with a second endpiece identical to the first endpiece and including in particular an auxiliary first fastener means 5'.

The first end CPE1 of the main cord CP is secured to said first auxiliary fastener means 5' arranged on the second endpiece of the second blade P'. At its second end CPE2, this cord possesses link means M2 which is connected to the second fastener means M1 arranged on the first endpiece of the first blade P. The main cord CP, as tensioned in this way, causes the two blades P and P' to flex downwards.

The first end CSE1 of the secondary cord CS is secured to the link means M2 and passes via deflector means 6 to extend towards the ground. The second end CSE2 of the secondary cord CS may optionally be fastened to anchor means 3 of the rotorcraft in order to stabilize the rotor with the secondary cord being tensioned very slightly. If anchor means are not available, the secondary cords can be grouped together and attached to one another.

FIGS. 4 and 5 show a first embodiment of the invention that is particularly advantageous. The link means is constituted by a ring M21 arranged between the main cord CP and the secondary cord CS. The second fastener means is constituted by a peg M11. Quick attachment is consequently implemented by engaging the ring M21 on the peg M11. Since the main cord CP is tensioned between two adjacent blades, the ring M21 cannot separate from the peg M11.

FIGS. 6 and 7 show a second embodiment. In this case the link means is a first abutment M22 in the form of a rectangular parallelepiped, arranged between the main cord CP and the secondary cord CS. The second fastener means is constituted by two parallel triangular plates M12 and M12' mounted on the intermediate plate 4, the main cord CP passing between said two parallel triangular plate M12 and M12'. Since the main cord CP is tensioned, the first abutment M22 is pressed against a first surface S1 and a second surface S2 respectively of the parallel triangular plate M12 and M12'. In addition, since the tension in the main cord CP is much greater than the tension in the secondary cord CS passing via the deflector means 6, there is no risk of the first abutment M22 separating while the secondary cords are being fastened.

FIGS. 8 and 9 show a third embodiment. The link means is constituted by a second abutment M23 in the form of a truncated rectangular parallelepiped having a chamfered face. The second fastener means is now made up of a receptacle M13 likewise in the form of a truncated rectangular parallelepiped. While the cords are being secured, the tensions in the main cord CP and in the secondary cord CS enable the second abutment M23 to bear against a third surface S3 of the receptacle M13.

FIG. 10 shows a fourth embodiment. The link means comprises a third abutment M24 in the form of a rectangular parallelepiped. The second fastener means is constituted by two triangular plates M14 and M14'. While the cords are being secured, the third abutment M24 is engaged between a fourth surface S4 of the plate M14 and a fifth surface S5 of the plate M14'.

FIG. 11 shows a fifth embodiment. The links means is constituted by a fourth abutment M25 in the form of a disk. The second fastener means is constituted by a perforated plate M15. While the cords are being secured, the fourth abutment is thus inserted into the orifice of the plate M15 and thus comes to bear against a sixth surface S6. In addition, this plate M15 possesses first and second grooves R1 and R2 through which the main cord CP and the secondary cord CS pass respectively.

FIGS. 12 and 13 show a variant of the invention. In this example, no deflector means is fastened to the intermediate plate 4. The second fastener means, constituted by an angled rod M16, also serves to perform this function. For this purpose, the link means, constituted by a ring M26, engages on the angled rod M16. The secondary cord CS connected to the ring M26 at a first end CSE1 is subsequently taken to anchor means of the rotorcraft.

Naturally, the present invention is amenable to numerous variations concerning its implementation. Although several embodiments are described above, it will readily be understood that it is not possible to identify exhaustively all possible configurations. Naturally, it is possible to replace any of the means described by means that are equivalent, without thereby going beyond the ambit of the present invention.

What is claimed is:

1. An endpiece for lashing down a rotorcraft blade, the endpiece being designed to be fastened to the end of the blade and being provided with first fastener means for fastening to a first main cord, and being provided with second fastener means for fastening to a second main cord,
    wherein said second main cord is extended by a secondary cord via link means, said link means cooperating with said second fastener means.

2. An endpiece according to claim 1, wherein the second end of the secondary cord is designed to be fastened to anchor means of the rotorcraft, the endpiece including deflector means supporting said secondary cord between said second fastener means and said anchor means.

3. An endpiece according to claim 1, wherein said second fastener means is a peg.

4. An endpiece according to claim 1, wherein said second fastener means includes at least one surface against which said link means comes to bear.

5. An endpiece according to claim 1, wherein the second fastener means also constitutes deflector means.

6. Device for lashing down a rotorcraft wing, said wing being provided with at least first and second adjacent blades, the ends of said blades being provided respectively with first and second endpieces according to claim 1,
the device comprising said first main cord having a first end fastened to said first fastener means arranged on the second endpiece of the second blade and having a second end secured to said second fastener means arranged on the first endpiece of the first blade.

7. A device according to claim 6, wherein said secondary cord has a first end connected to the second end of said first main cord by said link means.

8. A device according to claim 7, including anchor means on the rotorcraft designed for securing to the second end of said secondary cord.

9. A device according to claim 7, wherein said link means co-operate with said second fastener means.

10. A device according to claim 8, including deflector means supporting said secondary cord between said second fastener means and said anchor means.

11. A device according to claim 6, wherein said link means is a ring engaging said second fastener means.

12. A device according to claim 6, wherein said link means is an abutment coming to bear against at least one surface of said fastener means.

13. A device according to claim 6, wherein said second fastener means also constitutes deflector means.

14. A device for lashing down a blade of a rotorcraft having plural blades, comprising:
an intermediate plate removably attachable to the blade;
a first fastener affixed to said intermediate plate;
a first main cord extending between the blade and a first adjacent one of the blades of the rotorcraft, said first main cord being attached to said first fastener;
a second fastener affixed to said intermediate plate;
a second main cord extending between the blade and one of the blades of the rotorcraft other than the first adjacent one;
a secondary cord extending between the blade and an anchor; and
a link removably attached to said second fastener, said link joining said second main cord to said secondary cord.

15. The device of claim 14, further comprising a deflector affixed to said intermediate plate adjacent to said link, said secondary cord passing over said deflector between said link and the anchor.

16. The device of claim 14, wherein said second fastener is a peg that extends from said intermediate plate and said link is a ring that fits onto said peg and to which said second main cord and said secondary cord are attached.

17. The device of claim 14, wherein said second fastener includes a fixed surface and said link includes a block to which said second main cord and said secondary cord are attached, said block abutting against said fixed surface to removably attach said link to said second fastener when said second main cord is tensioned.

* * * * *